United States Patent [19]

Winkel

[11] Patent Number: 5,256,230
[45] Date of Patent: Oct. 26, 1993

[54] WINDING OF RESIN IMPREGNATED FIBERS USING A HEATED GUIDE

[75] Inventor: John D. Winkel, Bartlesville, Okla.

[73] Assignee: Phillips Petroleum Company, Bartlesville, Okla.

[21] Appl. No.: 725,710

[22] Filed: Jul. 3, 1991

[51] Int. Cl.⁵ ............................................. B65H 81/00
[52] U.S. Cl. .................... 156/175; 156/169; 156/173; 156/425; 156/322
[58] Field of Search ............... 156/169, 173, 175, 172, 156/166, 425, 441, 433, 320, 322

[56] References Cited

U.S. PATENT DOCUMENTS

| | | | |
|---|---|---|---|
| 3,112,234 | 11/1963 | Krupp | 156/169 |
| 3,148,102 | 9/1964 | Eakins et al. | 156/169 X |
| 3,169,717 | 2/1965 | Fox et al. | |
| 3,301,505 | 1/1967 | McLarty | |
| 3,438,587 | 4/1969 | Jackson, Jr. | |
| 3,698,651 | 10/1972 | Miller | 156/195 X |
| 4,010,054 | 3/1977 | Bradt | 156/173 |
| 4,067,183 | 1/1978 | Klose | |
| 4,169,564 | 10/1979 | Lehmann et al. | |
| 4,374,689 | 2/1983 | Smith et al. | 156/169 |
| 4,434,946 | 3/1984 | Lewin | |
| 4,488,686 | 12/1984 | Reese | |
| 4,509,702 | 4/1985 | Reese | |
| 4,610,402 | 9/1986 | Corbett et al. | 156/425 X |
| 4,685,637 | 8/1987 | Stitz | |
| 4,693,429 | 7/1987 | Billard et al. | |
| 4,867,834 | 9/1989 | Alenskis | 156/353 X |
| 4,869,761 | 9/1989 | Weingart et al. | 156/169 X |
| 4,877,471 | 10/1989 | McCowin et al. | 156/441 X |
| 4,997,503 | 3/1991 | Bohannan et al. | |
| 5,069,959 | 12/1991 | Gentile | 428/422 X |

FOREIGN PATENT DOCUMENTS

| | | | |
|---|---|---|---|
| 265915 | 5/1988 | European Pat. Off. | 156/173 |
| 307215 | 3/1989 | European Pat. Off. | 156/173 |
| 516388 | 1/1972 | Switzerland | 156/175 |
| 352788 | 10/1972 | U.S.S.R. | 156/175 |

OTHER PUBLICATIONS

Lubin, George, ed. *Handbook of Composites,* N.Y., Van Nostrand Reinhold Company, Inc., 1982, pp. 449 and 463–467.

Primary Examiner—Jeff H. Aftergut
Attorney, Agent, or Firm—William R. Sharp

[57] ABSTRACT

Winding of multiple tows upon a mandrel to form a desired article, such as a tube, is assisted by passing the multiple tows in contact with an exterior surface of a guide which is heated during the winding operation. The guide includes a first guide portion and a also a second guide portion having longitudinal axes which define an angle with respect to each other. The guide is positioned so that either guide portion is capable of receiving the tows so as to contact the exterior surface of the guide before being wound upon the mandrel. Employing the heated guide in accordance with the invention has been found to assist in aligning and at least partially consolidating the tows in a side-by-side relationship for delivery to the mandrel.

12 Claims, 4 Drawing Sheets

WINDING OF RESIN IMPREGNATED FIBERS USING A HEATED GUIDE

BACKGROUND OF THE INVENTION

This invention relates to a method and apparatus for winding resin impregnated fibers upon a mandrel, where a heated guide is employed to assist in the winding operation.

It is known to fabricate fiber reinforced articles by winding multiple tows of resin impregnated fibers upon a mandrel in a series of superimposed layers. In a typical winding procedure, the mandrel is rotated about its axis and a "payout" head moves in a reciprocating path along a given length of the mandrel and guides the multiple tows onto the mandrel.

It is important that the tows as delivered to the mandrel are aligned in a side-by-side relationship for optimum quality and strength of the resulting wound article. Although prior techniques have addressed this problem with some success, further improvement would be desirable.

SUMMARY OF THE INVENTION

It is, therefore, an object of the invention to provide an improved apparatus and method for winding multiple tows of resin impregnated fibers upon a mandrel.

The above object is realized by an apparatus comprising: a supply means for supplying a plurality of tows of resin impregnated fibers; a mandrel positioned to receive the tows from the supply means; a drive means for rotating the mandrel so as to withdraw the tows from the supply means and wind the tows upon the mandrel; a guide positioned between the supply means and the mandrel and comprising first and second guide portions having longitudinal axes which define an angle with respect to each other, wherein the guide is positioned so that either guide portion is capable of receiving the tows from the supply means so as to contact such guide portion's exterior surface before being wound upon the mandrel; and a heating means for heating the guide and its exterior surfaces corresponding to the first and second guide portions.

According to another aspect of the invention, there is provided a method comprising: (a) supplying a plurality of tows of resin impregnated fibers from a supply means to a mandrel; (b) rotating the mandrel so as to wind the tows upon the mandrel; (c) passing the tows, during steps (a) and (b), in contact with the exterior surface of one portion of a guide positioned between the supply means and the mandrel, wherein the guide comprises first and second guide portions as described above; (d) heating the guide and the exterior surfaces of the respective guide portions during step (c).

The guide in accordance with the invention has been found to be effective in delivering the multiple tows to the mandrel in an aligned side-by-side relationship. Heating of the guide assists in delivering the tows to the mandrel in the desired relationship by at least partially consolidating the tows upon contact with the guide to avoid undesirable separation or overlapping of the tows after passing from the guide. In this regard, it is particularly preferred to heat the exterior surface contacting the tows to a temperature at or above the melting point of the resin. The resin is preferably a thermoplastic, such as poly(phenylene sulfide).

According to other perferred aspects of the invention, a pivot means is provided to connect the guide portions so as to allow adjustment of the angle between the axes of the guide portions, and a means is provided to move the guide in opposite directions parallel to the rotational axis of the mandrel so as to pass the tows in contact with one guide portion when moving in one direction and in contact with the other guide portion when moving in the opposite direction.

BRIEF DESCRIPTION OF THE DRAWINGS

FIG. 2 also shows the mandrel in cross section as being adjacent to the guide.

DETAILED DESCRIPTION OF THE INVENTION

An embodiment of the invention will now be described with reference to the FIGURES in which a plurality of tows are wound in a helical pattern upon a mandrel to form a tubular structure.

Figure 1:
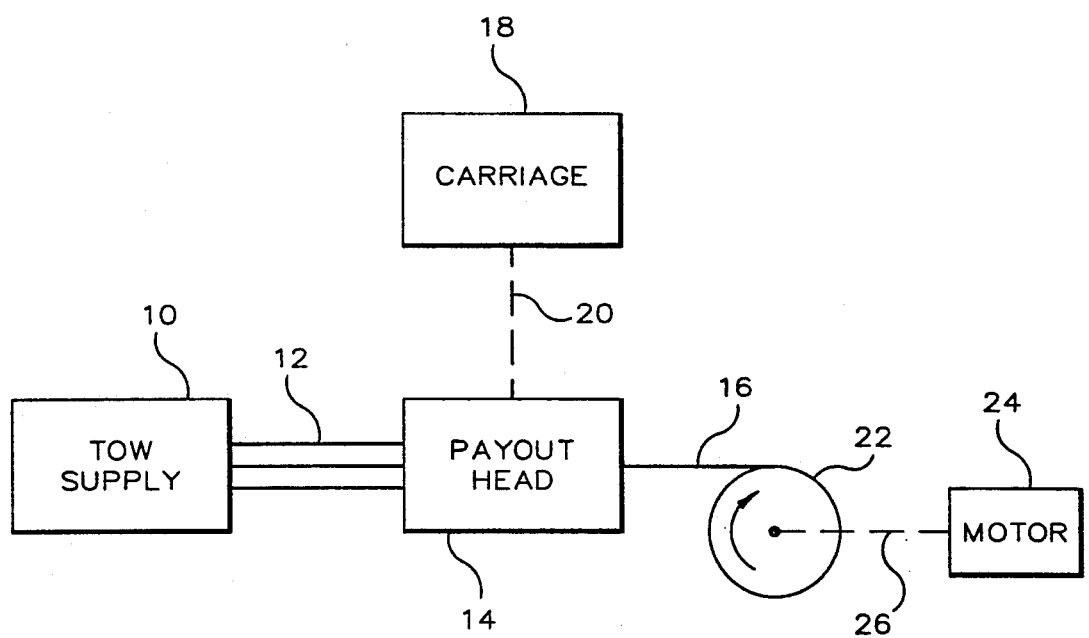
FIG. 1 is a schematic illustration of a winding apparatus which includes a payout head. The payout head includes a payout base plate and associated elements mounted thereto, which is illustrated in subsequent FIGURES.

Referring to FIG. 1, this FIGURE schematically illustrates a winding apparatus which includes: a tow supply 10 for supplying a plurality, in this case three, of resin impregnated fiber tows as indicated at 12; a payout head 14 for receiving and guiding tows 12 therethrough to produce a band 16; a carriage 18 connected to payout head 14 by a suitable link 20 that reciprocates the payout head 14 in a manner further described below; a mandrel 22 for receiving the band 16 as formed from the tows; and a motor 24 or other suitable drive means connected to mandrel 22 by a suitable drive link 26 for withdrawing tows 12 from tow supply 10 and through payout head 14 to mandrel 22, thereby winding band 16 as formed from the tows upon the mandrel.

Tow supply 10 is illustrated as supplying three tows 12 in the illustrated embodiment, but any number of tows can be employed depending upon various process conditions and the desired article to be formed. Typically, the number of tows employed is in the range of 2 to 10, more typically in the range of 3 to 5. Tows 12 can be in any suitable form, such as "prepreg" tapes comprising elongated strips having the fibers embedded in a resin matrix, in which case tow supply 10 would be a creel. Alternatively, tow supply 10 can include means to impregnate fibers with the resin. For example, fibers can be pulled through a resin bath where the fibers are impregnated with resin, after which the resulting tows of resin impregnated fibers are pulled through a suitable dryer.

Payout head 14 includes a payout base plate having various elements mounted thereto which is illustrated and described with reference to FIGS. 2-6.

Figure 2:
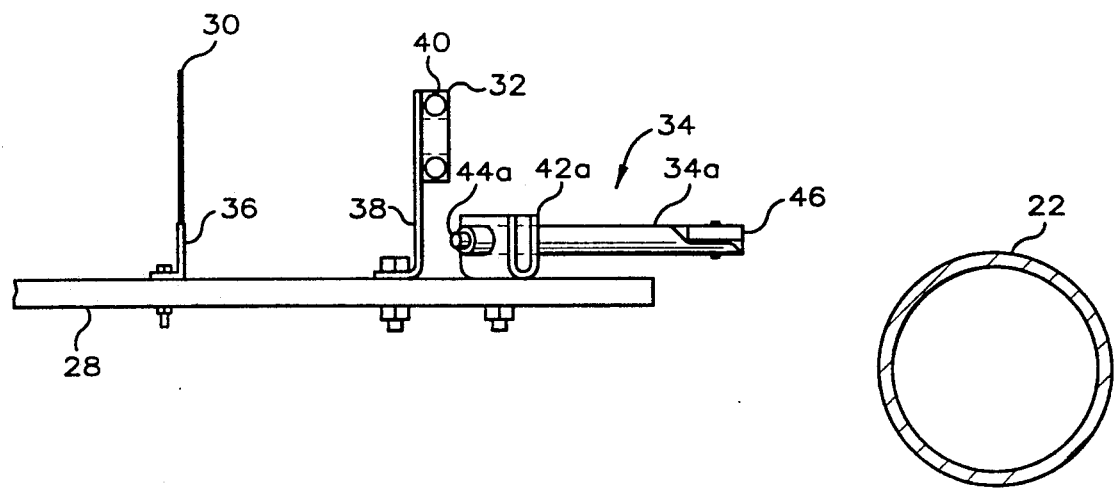
FIG. 2 is a side view of the payout base plate having a guide mounted thereto in accordance with the invention.

Referring to FIG. 2, this illustrated side view shows payout base plate 28 having a comb 30, ring 32 and guide 34 mounted thereto by appropriate brackets and bolts, and further shows a cross-sectional view of mandrel 22. Referring back to FIG. 1, it should be apparent that payout base plate 28 and the various elements mounted thereto are positioned between the tow supply 10 and mandrel 22.

Comb 30 is mounted to payout base plate 28 by means of bracket 36, and includes a plurality of vertically oriented pins, only one of which is shown in this FIGURE. The various pins of comb 30 can be connected to bracket 36 by suitable means, such as welds. As should be apparent from reference to FIGS. 1 and 2, comb 30 is positioned between tow supply 10 and ring 32.

Ring 32 is a generally annular member having an opening therethrough, indicated in broken lines, and is suitably connected to a bracket 38 having an opening aligned with the opening through ring 32. As shown, bracket 38 is appropriately mounted to payout base plate 28. A pair of electrical cartridge heaters 40 are preferably provided in ring 32, which extend through respective upper and lower portions thereof. Ring 32 is preferably positioned between comb 30 and guide 34 as illustrated, and can be composed of any suitable material, such as brass, conductive to heating by the cartridge heaters 40.

Guide 34 includes first and second guide portions, only one of which, guide portion 34a, is shown in FIG. 2. Guide portion 34a extends through and can be suitably connected to, such as by a weld, a U-shaped bracket 42a. Bracket 42a is appropriately mounted to payout base plate 28 to position guide 34 between ring 32 and mandrel 22. Guide 34 further includes a pair of cartridge heaters, only one of which, heater 44a, is shown in FIG. 2 as extending from one end of guide portion 34a. Guide 34 further includes a pivot means 46 for connecting the guide portions in a manner to allow relative adjustment thereof which will be discussed further below in connection with FIG. 3. Pivot means 46 is of the type which comprises a pair of rings which may rotate with respect to one another by means of a connecting shaft. One end of guide portion 34a is shown as having a reduced diameter and is suitably connected, such as by a weld, to the lower ring of pivot means 46. The other guide portion is similarly connected to the upper ring of pivot means 46. Any suitable material for the guide portions and pivot means 46 can be employed which is compatible with the temperatures to which the guide is heated. Stainless steel is a particularly preferred material.

With respect to the various cartridge heaters illustrated in FIG. 2 and in subsequent FIGURES, electrical leads extending from such cartridge heaters are not shown for clarity of illustration.

Figure 3:
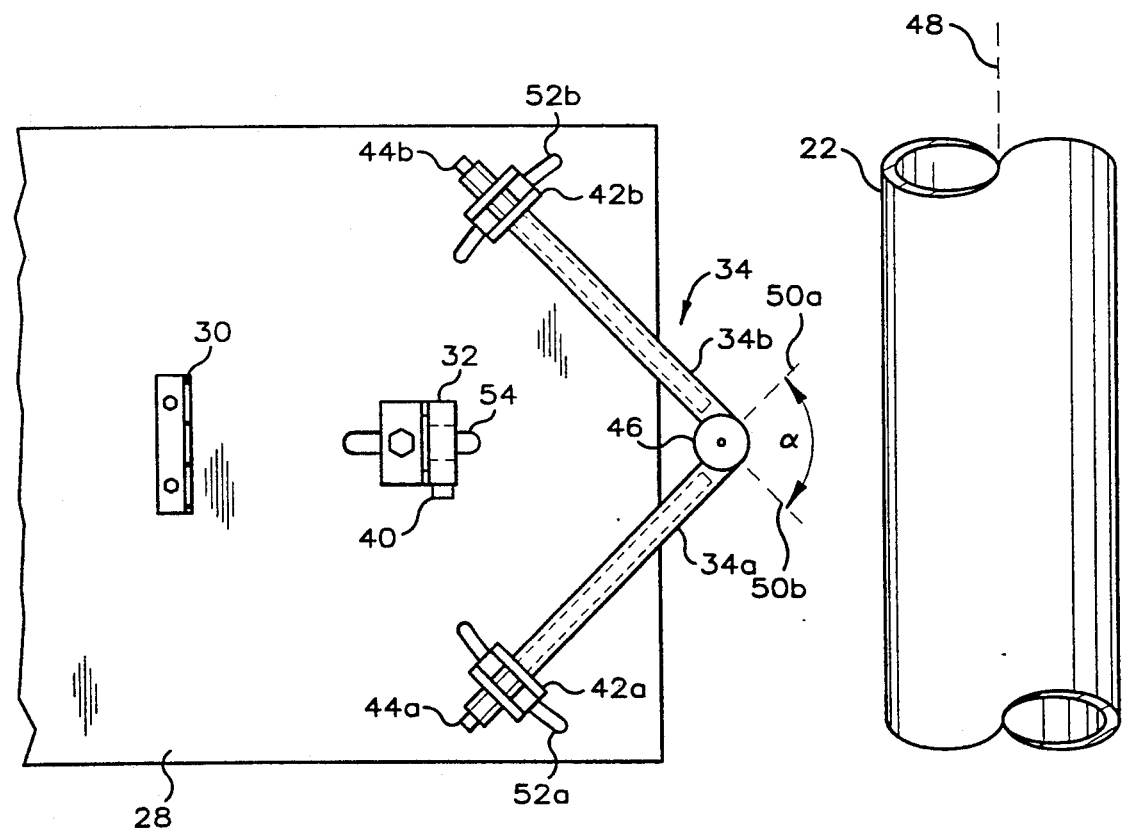
FIG. 3 is a top view of the payout base plate, guide and mandrel.

Referring to FIG. 3, this top view illustrates comb 30, ring 32 and guide 34 as being generally aligned, and further shows mandrel 22 and its rotational axis 48. In particular, FIG. 3 more clearly shows the structure of guide 34 and its respective guide portions 34a and 34b. Each guide portion, 34a and 34b, is mounted to payout base plate 28 by means of its respective U-shaped bracket 44a and 44b, and in the illustrated embodiment is an elongated tube having an exterior surface which is preferably generally cylindrical in shape. Guide portion 34a has a longitudinal axis 50a, and guide portion 34b has a longitudinal axis 50b which defines an angle α with respect to longitudinal axis 50a. Angle α can vary widely, but generally is in the range of about 60° to 100° for the purpose of a helical winding operation. Pivot means 46 connects respective ends of guide portions 34a and 34b to allow adjustment of angle α. Such an adjustment can be made prior to a winding operation in accordance with a desired helical winding angle, as will be discussed further below. Generally circumferential slots 52a and 52b are provided in payout base plate 28 to allow adjustment of the positions of brackets 42a and 42b in adjustment of angle α. An elongated slot 54 is further provided in payout base plate 28 to allow longitudinal adjustment of the position of ring 32 which is desirable in making an adjustment in angle α.

As further shown in FIG. 3, cartridge heaters 44a and 44b are also preferably tubular and extend, as indicated by broken lines, through the respective interiors of guide portions 34a and 34b so as to be generally coaxial therewith. Cartridge heaters 44a and 44b can be mounted within respective guide portions 34a and 34b by means of a suitable cement, preferably having good heat transfer properties. A cartridge heater 40 associated with ring 32 is also shown in FIG. 3.

Operation of the apparatus will now be described with reference to FIG. 4.

The three tows 12 of resin impregnated fibers, illustrated as being in the form of tapes, are shown as being supplied from tow supply. In regard to composition of the tows, the resin is preferably a thermoplastic, such as a polyolefin, polyester, polycarbonate, polyamide or an aromatic sulfide polymer from the poly(arylene sulfide) (PAS) family. The last mentioned PAS polymer is particularly preferred in accordance with the invention and is noted for its excellent chemical resistance, good thermostability, and physical strength. A particular PAS polymer, poly(phenylene sulfide) (PPS), has been employed with good results. One type of suitable poly(phenylene sulfide) is a commercial engineering thermoplastic resin that is semi-crystalline in nature with a glass transition temperature of about 85° C. and a crystalline melting point of about 285° C., sold under the trademark Ryton® PPS by Phillips 66 Company of Bartlesville, Okla. The fiber reinforcement suitable for use in the present invention can be selected from a wide variety of materials. The fiber selected should not decompose or melt at or below processing temperatures for the resin selected. For poly(arylene sulfide) resins, glass, carbon and aramid fibers are most preferred.

As shown, the three tows 12 are passed to and through comb 30. Accordingly, the tows converge but are maintained by the comb in a separated relationship. The tows then pass to and through ring 30 so as to further converge. Ring 32 is preferably heated by the cartridge heaters 40 for the purpose of preheating tows 12 before reaching guide 34. The temperature selected for ring 32 can vary widely, but can be set at or above the melting point of the resin. The temperature should be sufficiently low, however, so that the tows maintain their shape and form. Where poly(phenylene sulfide) is used as the resin, ring 32 is preferably maintained at a temperature in the range of about 310° C. to about 450° C.

Figure 4:
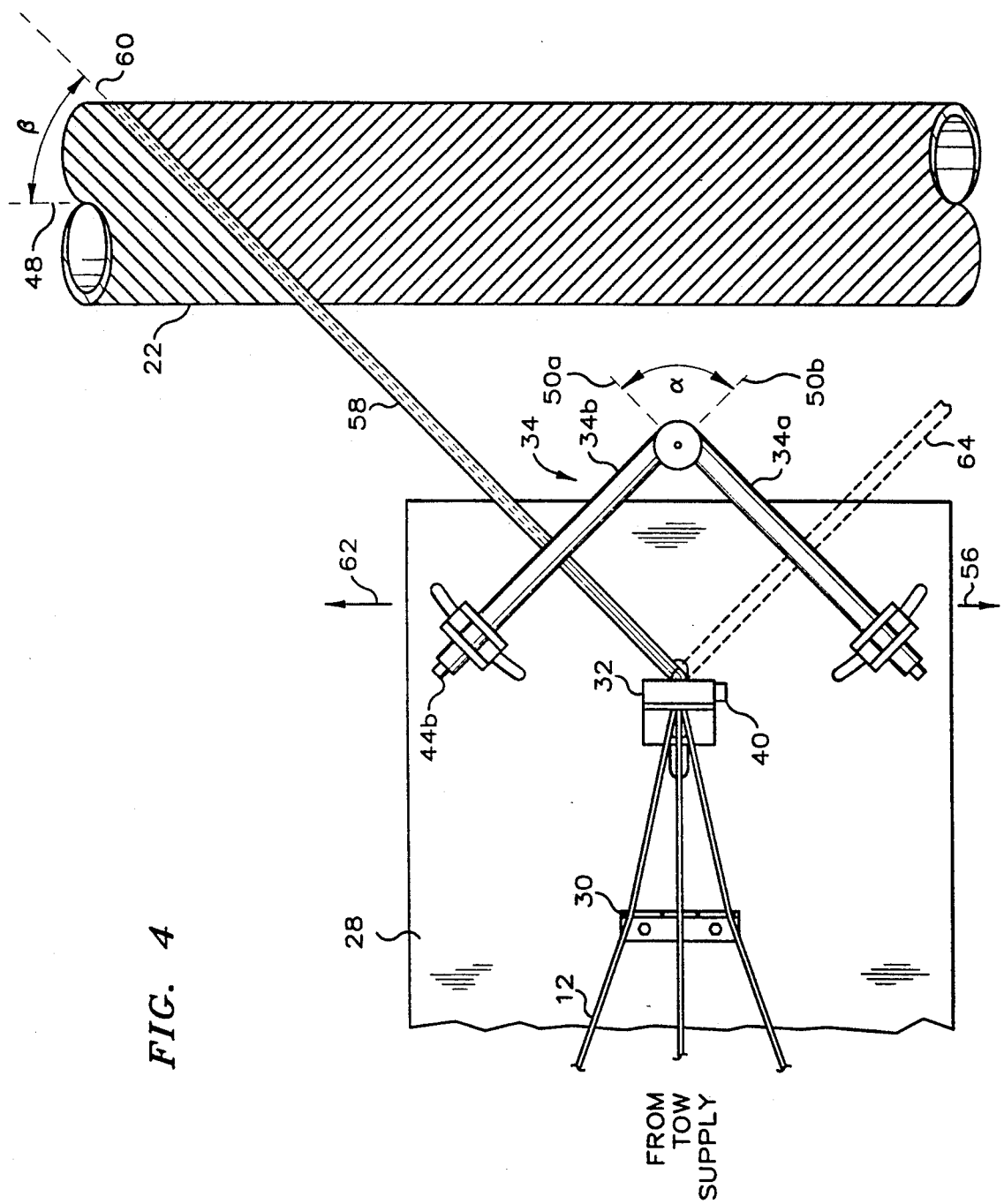
FIG. 4 is a top view of the apparatus of FIG. 3 while operating to wind a number of tows upon the mandrel.

As illustrated in FIG. 4, payout base plate 28 is being moved by the carriage in the direction indicated at 56, which is generally parallel to rotational axis 48. Therefore, the tows 12 pass under and in contact with the exterior surface of guide portion 34b so as to align the tows in a side-by-side relationship and thereby form band 58. Band 58 has a longitudinal axis 60 which is preferably perpendicular to longitudinal axis 50a to accordingly assist in achieving a generally flat and planar configuration for the band. Axis 60 also defines an acute angle $\beta$ with respect to rotational axis 48. Angle $\beta$ is preferably about one-half angle $\alpha$ in a typical helical winding operation.

Guide portion 34b and its exterior surface is heated by means of cartridge heater 44b, while the tows pass in contact with the exterior surface of guide portion 34b. Guide portion 34b is preferably heated to a temperature sufficient to soften the tows so that adjacent tows at least partially consolidate along their edges. These consolidated edges are indicated in FIG. 4 by the broken lines. It is most preferable to heat guide portion 34b to a temperature whereby the exterior surface contacting the tows has a temperature at or above the melting point of the resin, but sufficiently low to ensure the tows maintain their shape and form. Where poly(phenylene sulfide) is used as the resin, it is most preferable to heat guide portion 34b and its exterior surface to a temperature in the range of about 310° C. to about 450° C.

As explained previously in the Summary of the Invention, consolidation of the tows in the manner described above is particularly advantageous insofar as it avoids undesirable separation or overlapping of the tows after passing from guide 34. This accordingly assists in preventing formation of voids and/or inconsistent density in the resulting tubular article. With regard to voids or gaps in the wound article, such defects affect the mechanical strength of the resulting tubular article.

The band 58 is wound upon mandrel 22 as illustrated to form a layer upon the mandrel. This layer is formed so as to contact a layer immediately below, which had been wound previously in the opposite direction. It is preferred that band 58, as it contacts the previously wound layer, is at a temperature sufficient to permit consolidation between the layers, most preferably at or above the melting point of the resin. In the illustrated embodiment, the ring 32 and guide 34 cooperate to supply the heat to the tows and resulting band 58. It is preferable that the heat so supplied is sufficient to allow consolidation of contacting layers upon the mandrel. In this regard, the relative positioning of ring 32, guide 34 and mandrel 22 is preferably such that band 58 retains the necessary heat for consolidation when reaching mandrel 22.

It is within the scope of the invention, however, to provide a supplemental heat source to enhance consolidation between layers as wound upon the mandrel. Such a supplemental heat source could include, for example, an internal heating source within the mandrel, or a heating source external to the mandrel such as an air gun for blowing hot air upon the layers, an infrared heater or simply a hot iron to directly contact a layer as it is being wound upon the mandrel.

Once band 58 has been wound upon the mandrel to completely form a layer across the length of the mandrel, payout base plate 28 is then moved by the carriage in a direction indicated at 62, which is parallel to rotational axis 48 and opposite to direction 56. This causes the band to shift from guide portion 34b to guide portion 34a and pass under and contact with the exterior surface of such guide portion 34a. The position of the band in this regard is indicated by broken lines at 64. The band is similarly heated by contact with the exterior surface of guide portion 34a, at least partially consolidated in the manner discussed above, and similarly wound upon the mandrel.

Figure 5:
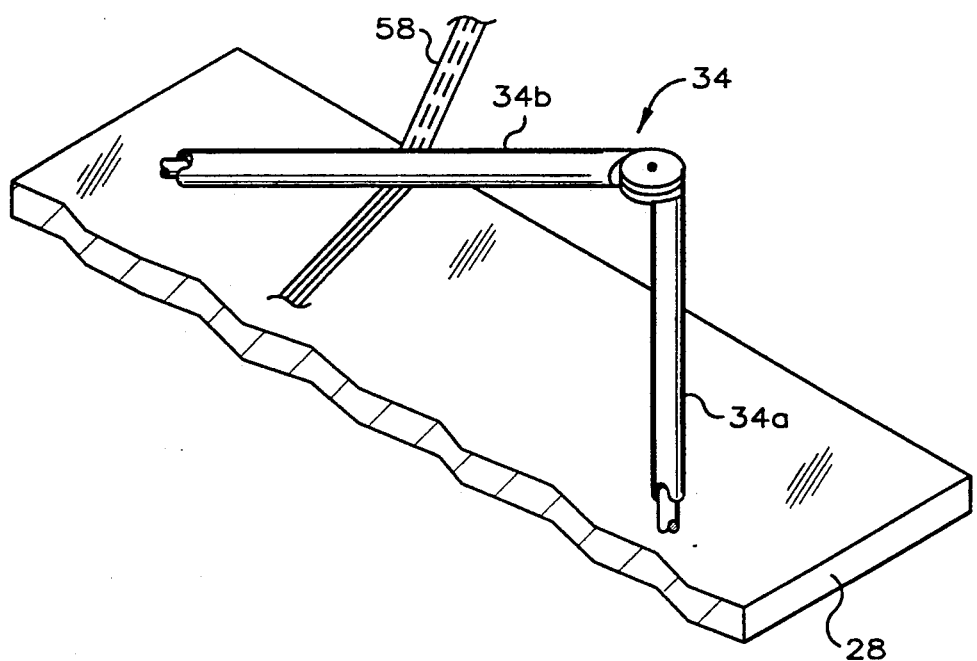
FIG. 5 is an isometric view of the guide shown in FIGS. 2-4, which illustrates the manner in which the tows pass in contact with the exterior surface of the guide.

Referring to FIG. 5, this isometric view of guide 34 more clearly illustrates the manner in which the tows pass under and in contact with the exterior surface of guide portion 34b in accordance with the illustrated embodiment.

Figure 6:
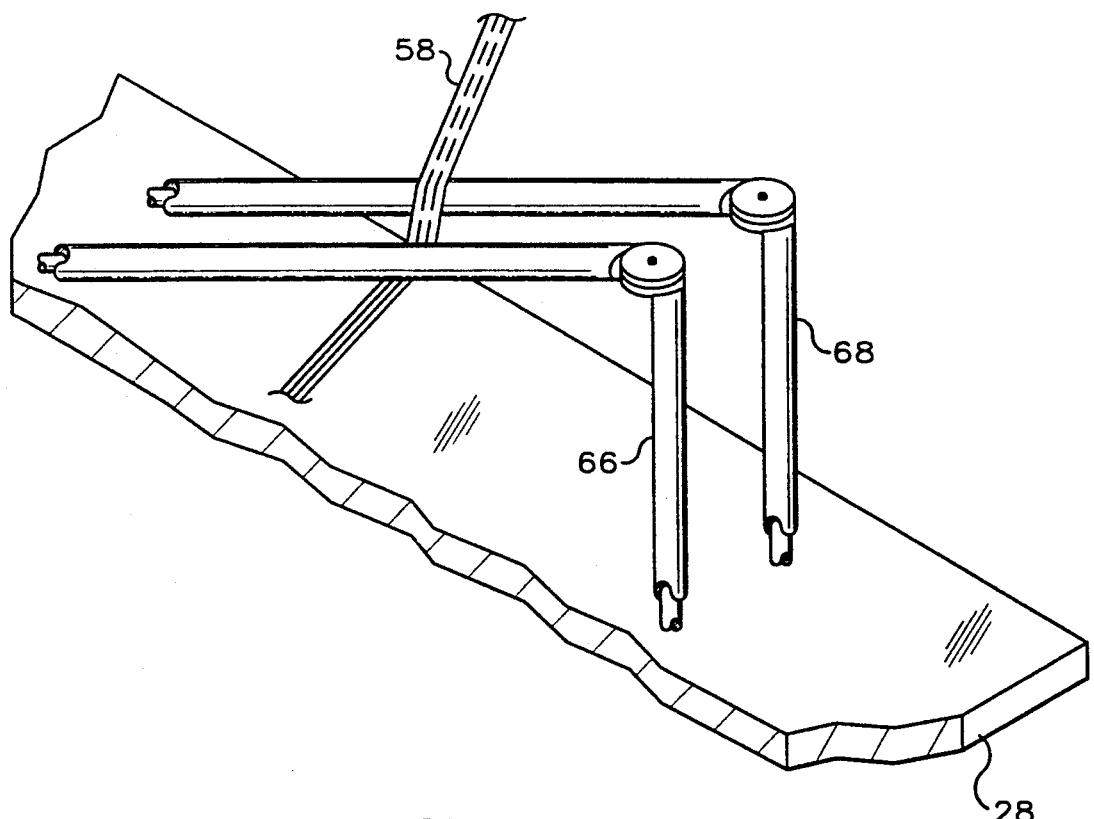
FIG. 6 is an isometric view of another embodiment of the invention employing two guides.

Referring to FIG. 6, there is shown at an alternate embodiment of the invention including two closely adjacent guides, 66 and 68, which are mounted to the payout base plate 28 so that the tows contact the exterior surface of one guide portion of each of the guides. As shown in the illustrated alternate embodiment, the tows first pass under and in contact with one guide portion of guide 66, and then over and in contact with one guide portion of guide 68. By employing two guides in this manner, more heat transfer is provided to the tows to thereby enhance consolidation between the tows and possibly also enhance consolidation between the wound layers upon the mandrel.

Although not discussed above, various winding parameters can vary widely, depending on the type of article being wound and the desired properties of such article. Such parameters include linespeed (speed of tows as delivered to the mandrel), bandwidth (width of the band), band advance (advance of the band with each wrap or circuit around the mandrel), circuits per pattern (number of circuits required to start from one point on the mandrel and return to such point) and circuits per coverage (number of circuits to completely cover the mandrel).

Finally, it should be understood that many modifications and variations of the invention are possible in light of the above teachings. For example, according to certain aspects of the invention, the comb could be eliminated and only a ring employed to provide the necessary convergence of the tows before being passed to the guide. Conversely, the comb could be used in lieu of the ring. In addition, heating of the ring could be eliminated if heat supplied by the guide was sufficient to perform the desired consolidation. However, it is particularly desirable to heat the ring to perform a preheating function and therefore enhance the resulting consolidation.

EXAMPLES

Examples will now be presented to further illustrate the invention, but should not be construed to limit the invention in any manner.

Each of the examples employed tows in the form of prepreg tapes of carbon fiber reinforced polyphenylene sulfide. The fibers were unidirectionally oriented parallel to the longitudinal axis of the tape.

EXAMPLE 1

The purpose of this example is to demonstrate the production of a wound tube in accordance with one embodiment of the invention.

The apparatus employed was a McClean Anderson Model W-90 filament winder having a payout base plate extending from the payout head. Mounted on the plate with C-clamps was a 1½ inch I.D. brass ring having cartridge heaters extending therethrough, and a guide constructed of two 8 inch×½ inch 1000 watt cartridge heaters. The cartridge heaters of the guide were clamped to the payout base plate in a V-shape so that their respective axes defined an 80° angle. A 10 inch diameter aluminum mandrel was positioned relative to the guide such that the first point of contact of the tows with the mandrel surface was about 4 inches from the closest point of the guide.

Three tows having individual widths of 0.253 inch, 0.260 inch and 0.270 inch, respectively, were wound upon the mandrel in a ±40° helical winding pattern after having passed under and in contact with the guide by employing a linespeed of 18 feet/minute, a bandwidth of from 0.570 inch to 0.630 inch, a band advance of 0.450 inch, 25 circuits per pattern and 53 circuits per coverage. The guide and ring were heated so as to produce a tow temperature upon contact with the mandrel of about 310° C.

The guide was found to operate effectively at aligning the tows in a side-by-side relationship to form the band without twisting. The tube produced by the winding operation was observed to have well consolidated wound bands.

EXAMPLE 2

The purpose of this example is to further demonstrate the invention employing an embodiment of the guide as previously described and illustrated.

The apparatus of this example was substantially similar to the apparatus of Example 1, except for the guide which was substantially similar to that embodiment shown in the FIGURES. The guide was constructed by bending ¾ inch O.D. stainless steel tubing to an angle of 80°, filling the tube with Thermon® heat transfer cement, and inserting a 1000 watt 8 inch×½ inch cartridge heater into each end of the tube. The guide was clamped to the payout base plate at a location relative to the mandrel similar to that described in Example 1.

Three tows like those used in Example 1 were wound upon the mandrel in a ±40° helical pattern employing a linespeed of about 18 feet/minute, a bandwidth of from 0.465–0.659 inch, 25 circuits per pattern and 53 circuits per coverage. The tows were passed under and in contact with the guide as in Example 1. Both the ring and guide were heated during this run, of which temperatures were measured using a handheld infrared temperature sensor device. Temperature measurements were made at the center of the guide (point A), near each end of the guide (points B and C), and at points approximately mid-way between points A and B (point D) and A and C (point E). According to nomenclature used in the above description of the invention, points B and D correspond to a first guide portion whereas points C and E correspond to a second guide portion. The temperature measured at the ring was designated as point F. At both the beginning and end of the run, points B, C, D, E and F were all within 3° C. of 441° C. while point A increased from 149° C. initially to 254° C. at the end of the run.

The guide in this example also effectively functioned to align the tows without twisting, but consolidation was not as good as in Example 1.

EXAMPLE 3

The purpose of this example is to further demonstrate another embodiment of the invention using two guides.

The apparatus of this example was substantially similar to the apparatus of Example 2, except that a comb was included 5 inches upstream from the ring, and a second guide was included at a position closely adjacent to and downstream from the first guide.

Three tows substantially like those used in Example 2 were wound upon the mandrel in a ±40° helical pattern employing other process parameters substantially similar to those of Example 2, and where the tows passed under the first guide but over the second guide. Ring and guide temperatures were again measured with the infrared sensing device, but guide temperatures were measured in this run at the points of contact of the tows with the guides. Ring temperature was measured to be 327° C. Temperatures for the guides were found to differ depending on whether the wrap was from headstock-to-tailstock or tailstock-to-headstock. Headstock denotes the end of the mandrel driven by the motor and the tailstock is the end which is merely supported. For the headstock-to-tailstock wrap, the measured temperatures for the respective guide portions of the first and second guides were 442° C. and 437° C., respectively. For the tailstock-to-headstock wrap, the corresponding temperatures for the other guide portions of the guides were 416° C. and 285° C. The abnormally low 285° C. temperature may have been due to a malfunctioning cartridge heater in the second guide.

Results of this run were similar to those from Example 2.

EXAMPLE 4

The purpose of this example is to further demonstrate the invention in conjunction with a supplemental heating source.

The apparatus of this example was substantially similar to the apparatus of Example 3. However, a handheld hot "iron" was also employed by applying its hot surface against the band of tows as it was wound upon the mandrel.

Three tows substantially like those used in Example 2 were wound upon the mandrel in a ±40° helical pattern employing other process parameters substantially similar to those of Example 2. Temperatures were measured as in Example 3. The ring temperature was measured to be 391° C., and the guide temperatures for the first and second guides (unrecorded as to which wrap) were measured to be 370° C. and 374° C., respectively. The iron temperature was 437° C.

The resulting tube was found to be well consolidated and generally free of gaps and voids.

That which is claimed is:
1. A method comprising:
   (a) supplying a plurality of tows of resin impregnated fibers from a supply means to a mandrel which has a rotational axis, wherein each of the tows is a prepreg tape having opposing edges;
   (b) rotating the mandrel so as to wind the tows upon the mandrel;
   (c) passing the tows, during steps (a) and (b), in contact with an exterior surface of one portion of a guide positioned between the supply means and the mandrel, wherein the guide comprises a first guide portion having a first longitudinal axis and a second guide portion having a second longitudinal axis defining an angle α with respect to the first longitudinal axis, and wherein the tows pass in contact with the exterior surface of said one guide portion so as to align and at least partially consolidate, upon said contact, adjacent tows along edges thereof in a side-by-side relationship to form a band which has a longitudinal axis and which is generally flat and planar, and further wherein the longitudinal axis of the band is generally perpendicular to the longitudinal axis of said one guide portion as the tows pass in contact with the exterior surface of said one guide portion, and the longitudinal axis of the band defines an acute angle with respect to the rotational axis of the mandrel which is about one-half α;

(d) heating the guide and the exterior surfaces of the respective guide portions during step (c) to a temperature at or above the melting point of the resin in the tows.

2. A method as recited in claim 1 wherein each of the first and second guide portions is a tube and wherein in step (d) heat is supplied from a heater within said one guide portion.

3. A method as recited in claim 1 wherein there is provided a ring between the supply means and the guide and wherein the method further comprises passing the tows from the supply means, to and through the ring, and then to the guide.

4. A method as recited in claim 3 further comprising heating the ring while the tows pass through the ring.

5. A method as recited in claim 4 wherein there is provided a comb positioned between the supply means and the ring, and wherein the method further comprises passing the tows from the supply means, to and through the comb, and then to the ring.

6. A method as recited in claim 5 wherein there is provided a base plate to which the guide, ring and comb are mounted, and wherein the method further comprises moving the base plate and the guide, ring and comb as mounted thereto during steps (a)-(d) in a first direction generally parallel to the rotational axis of the mandrel, and thereafter moving the base plate and the guide, ring and comb as mounted thereto in a second direction opposite to the first direction so that the tows pass in contact with an exterior surface of an other guide portion.

7. A method as recited in claim 1 wherein the resin comprises a thermoplastic.

8. A method as recited in claim 7 wherein the thermoplastic is a poly(arylene sulfide).

9. A method as recited in claim 8 wherein the thermoplastic is poly(phenylene sulfide).

10. A method as recited in claim 9 wherein the fibers are selected from the group consisting of carbon fibers, glass fibers and aramid fibers.

11. A method as recited in claim 1 wherein said guide is denoted as a first guide and wherein there is further provided a second guide, having corresponding guide portions and exterior surfaces, positioned closely adjacent to the first guide, said method further comprising passing the tows, during steps (a) and (b), in contact with the exterior surface of one of the guide portions of the second guide.

12. A method as recited in claim 1 wherein there is provided a pivot means for connecting the first and second guide portions to allow adjustment of α, wherein the method further comprises adjusting the relative positions of the guide portions to thereby adjust α before step (a).

* * * * *